July 5, 1938.    P. LIRA    2,122,946
FILM FEEDING MECHANISM
Filed Dec. 30, 1935    4 Sheets-Sheet 1
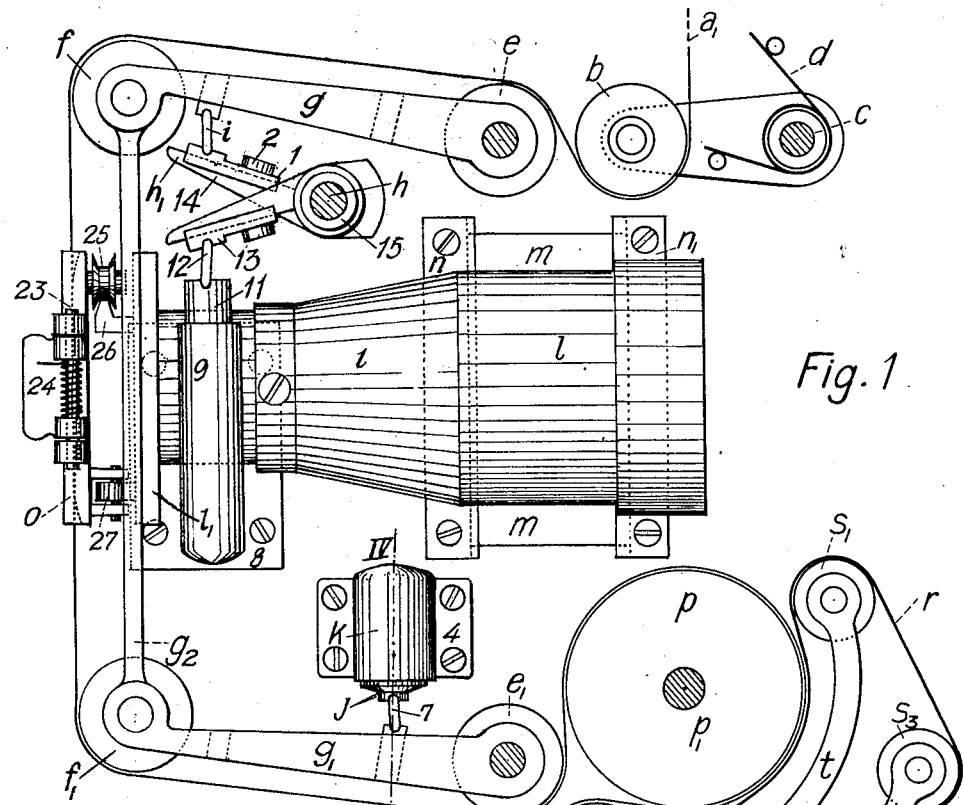
Fig. 1
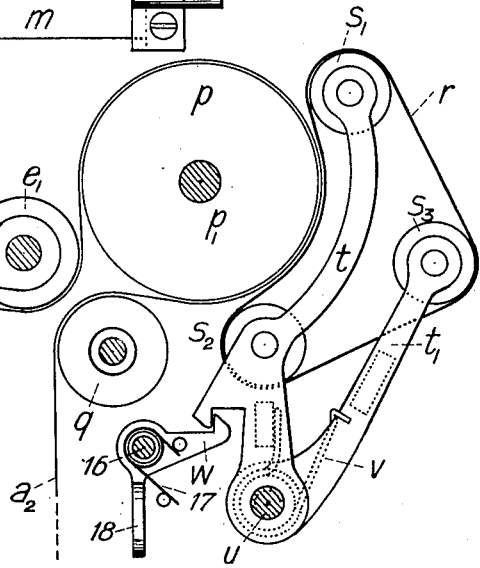
Fig. 4
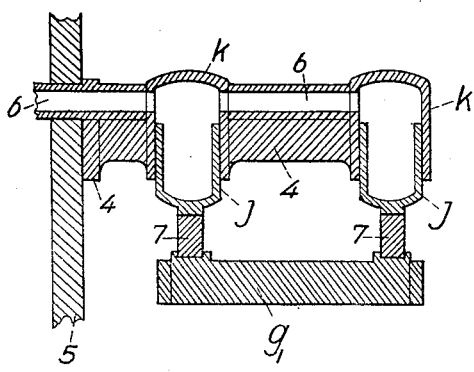
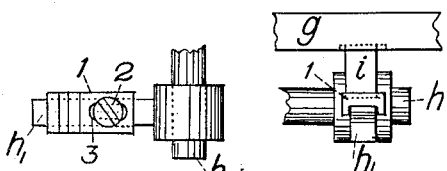
Fig. 2    Fig. 3
P. Lira
INVENTOR
By: Glascock Downing & Seebold
Attys.

July 5, 1938.  P. LIRA  2,122,946
FILM FEEDING MECHANISM
Filed Dec. 30, 1935  4 Sheets-Sheet 2

P. Lira
INVENTOR
By Glascock Downing & Seebold
Attys.

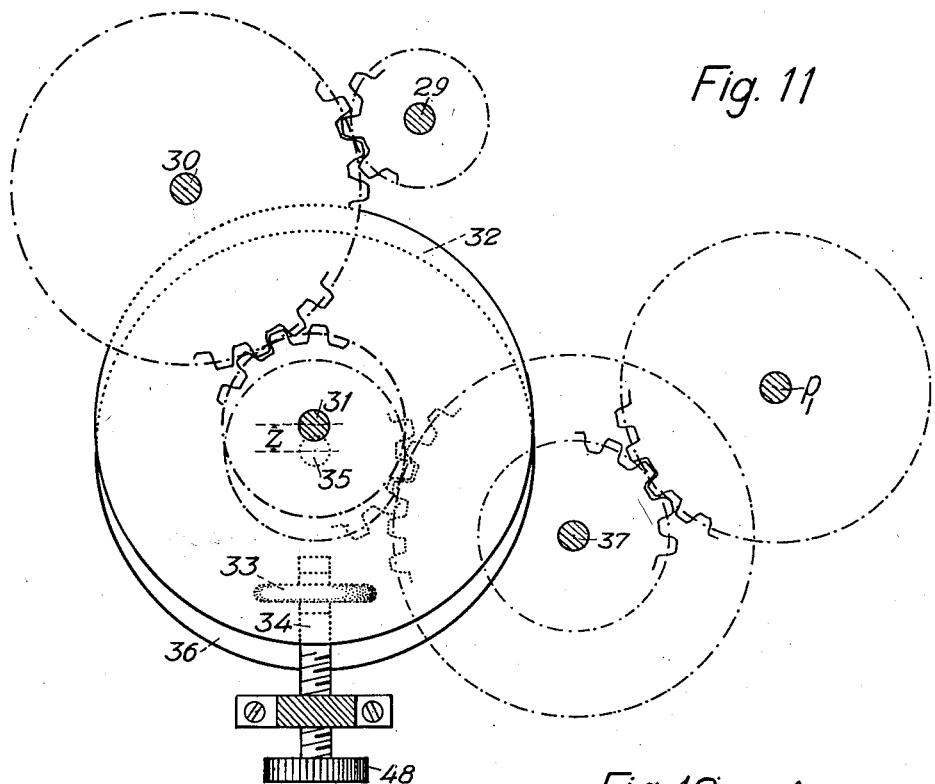
Fig. 11
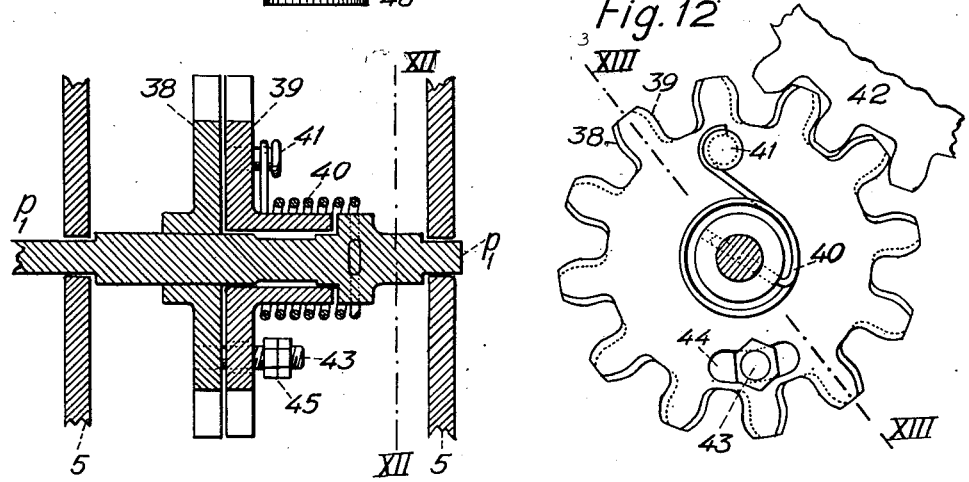
Fig. 13
Fig. 12

July 5, 1938.  P. LIRA  2,122,946

FILM FEEDING MECHANISM

Filed Dec. 30, 1935  4 Sheets-Sheet 4

P. Lira
INVENTOR
By: Glascock Downing & Seebold
Attys.

Patented July 5, 1938

2,122,946

UNITED STATES PATENT OFFICE 2,122,946

FILM FEEDING MECHANISM

Pedro Lira, Santiago, Chile

Application December 30, 1935, Serial No. 56,803

4 Claims. (Cl. 88—18)

My invention relates to improvements in the cinematographic mechanism described in my Patent No. 1,992,706 granted February 26, 1935 and in my Patent No. 2,021,560 issued November 19, 1935.

Said improvements are mainly designed for cine-projectors and refers to the following points:

(a) The connection between the rocker-shaft and the reciprocating film-carrier or oscillator;

(b) The use of compressed air actioned pistons instead of springs to force a continuous contact between the oscillator and the rocker-shaft;

(c) The use of reciprocating pistons actioned by compressed air for counterbalancing the reciprocating film-carrier movement;

(d) A device for increasing the adherence between the driving-pulley and the film;

(e) A device to keep the film flat when passing through the field of the lens;

(f) The elimination of the play in the spur gears connecting the cam-shaft with the driving-pulley shaft; and (g) The differential friction gearing between the cam-shaft and the driving pulley shaft, or "differential corrector".

The object of my invention is to secure a more silent, efficient and accurate running of the whole mechanism.

I reach these objects by means of the mechanisms shown in the accompanying drawings, wherein:

Figure 1 is a general side view of the central parts of the cine-projector mechanism, without indication of the means for the transmission of the movement.

Figures 2 and 3 show the rocker-arm and its connection to the reciprocating film-carrier, as follows: Figure 2 is a plan view and Figure 3 is a front elevation.

Figure 4 is a section on the line IV—IV of Figure 1, showing the compressed air actioned pistons and their connection with the reciprocating film-carrier.

Figure 5 is a side view and Figure 6 is a section on the line VI—VI of Figure 5.

Figure 7 is a side view and Figure 8 is a rear elevation in which the endless strip has been omitted for the sake of clearness.

Figure 9 is a front elevation and Figure 10 is a section on the line X—X of Figure 9.

Figure 11 shows diagrammatically the transmission of the movement from the cam-shaft to the driving pulley shaft of the mechanism shown in Figure 1.

Figures 12 and 13 show a device to eliminate the play in the spur gears, as follows: Figure 12 is a section on the line XII—XII of Figure 13 and view of the mechanisms behind this section, and Figure 13 is a section on the line XIII—XIII of Figure 12.

Figure 14 is a section on the line XIV—XIV of Figure 15, and Figure 15 is a section on the line XV—XV of Figure 14 and view of the mechanisms behind this section.

The same letters and numbers denote the same parts throughout the drawings.

General description of the mechanism

Figure 5:
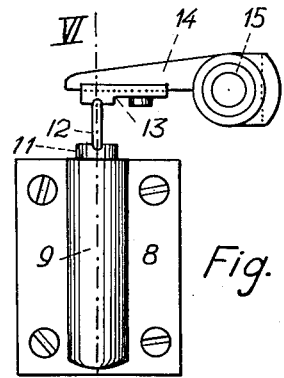
Figures 5 and 6 show the reciprocating pistons actioned by compressed air for counterbalancing the reciprocating film-carrier movement, as follows.

In Figure 1 $a_1$ is the film coming from the unwinding reel at a constant tension as explained in my Patent No. 1,992,706.

$b$ is a tension free roller supported by an arm free to pivot on fixed shaft $c$, regulating the tension of the film by means of a spring $d$.

$e$, $e_1$ are free rollers with fixed shafts, which I will name "oscillator incoming roller" and "oscillator outcoming roller" respectively.

$f$, $f_1$ are the free rollers of the reciprocating film-carrier (or "oscillator"); these rollers are connected by means of rigid oscillating frames $g$ and $g_1$ to the fixed shafts of the rollers $e$ and $e_1$ respectively.

$g_2$ are two parallel rods connecting the frames $g$ and $g_1$.

$h$ is a rocker-shaft provided with a rocker-arm $h_1$ connected to the oscillating frame $g$ by means of the intermediary pushing-rod $i$. Rocker-shaft is also in connection with a cam mounted on a cam-shaft not shown in Figure 1 for the sake of clearness.

$j$ are movable pistons free to slide into fixed hollow cylinders $k$ connected to a compressed air tank (not shown in the drawings).

$l$ is the mounting of the lens, provided with an extension $l_1$ which supports the part $o$ designed for keeping the film flat when passing through the field of the lens.

$m$ is a support for the mounting $l$ of the lens; said support $m$ can be shifted upwards or downwards, sliding on fixed guides $n$ $n_1$ in order to center the projected picture.

$p$ is a pulley fixed on a shaft $p_1$ whose rotation produces a continuous and uniform driving of the film simply by adherence; I name it "driving pulley".

$s_1$, $s_2$ are free rollers supported by a mounting $t$ which pivot on fixed shaft $u$.

$s_3$ is a free roller supported by a mounting $t_1$ which pivots on the same shaft $u$ of mounting $t$.

$r$ is an endless strip passing over the rollers $s_1$, $s_2$, $s_3$.

$v$ is a spring continuously tending to separate mountings $t$ and $t_1$, whereby the endless strip $r$ is kept in tension.

$w$ is a catch which serves to keep the mounting $t$ in a suitable position for pressing the endless strip $r$ against the driving pulley $p$ without pressing rollers $s_1$ and $s_2$ against same pulley.

$q$ is a free roller on a fixed shaft; and $a_2$ is the film going to the rewinding reel at a constant tension as explained in my Patent No. 1,992,706.

There must be a general support for the mechanism, which I will name "projector frame part". For the sake of clearness all the shafts in Figure 1 which are directly supported by said projector frame part are hatched.

The means for the transmission of the movement from the camshaft to the driving-pulley shaft are shown in Figure 11, as follows:

29 is the cam-shaft, which is supposed to be the power-shaft also.

Camshaft 29 is geared to shaft 31 by means of intermediate shaft 30. On shaft 31 is mounted a flat friction disc 32.

Shaft 35 bears flat friction disc 36 parallel to disc 32 and friction geared to it by means of the intermediate friction wheel 33 mounted on a transversal shaft 34.

Shaft 35 is also geared to the driving pulley shaft $p_1$ by means of the intermediary shaft 37.

The assembly of shafts 31, 34 and 35 forms a device which I name "differential corrector" and is described hereinafter in detail. The object of this device is to change at will the gear ratio between the camshaft 29 and the driving-pulley shaft $p_1$, so that the running of the film may be regulated according to the small possible differences in the distance between the centers of successive frames or pictures in said film, due to the expansion or to the shrinking of Celluloid.

It is worth being mentioned that cam-shaft 29 is geared also to the rewinding reel dragging mechanism, as explained in my Patent No. 1,992,706.

*Working of the cinematographic mechanism.*—The film comes from the unwinding reel at $a_1$ and runs successively over the tension roller $b$, the oscillator incoming roller $e$, the oscillator upper roller $o$, the part $o$, the oscillator lower roller $f_1$, the outcoming roller $e_1$, the driving pulley $p$, and the free roller $q$, going finally at $a_2$ to the rewinding reel.

When the cam-shaft 29 works, its movement is transmitted to the driving pulley $p$ and to the rewinding reel dragging mechanism through the gearing, as formerly described.

As a result of this the film is set in tension all along its way from the unwinding reel to the rewinding one, and a continuous and uniform running of the film follows owing to the adherence between the film and the driving pulley, as explained in detail in my Patent No. 1,992,706.

At the same time the action of the cam on the rocker-shaft $h$ produces a reciprocating movement of the oscillator rollers $f$ and $f_1$, whereby the movement of the film when passing through the field of the lens is composed of successive stops and runs, owing to the composition of the uniform velocity of the film with the reciprocating movement of the oscillator, as explained in detail in my Patent No. 1,992,706.

The present application refers to improvements in several details of the mechanism, as formerly stated.

*Improvements in the connection between the rocker shaft and the reciprocating film carrier.*—The direct contact between the rocker-arm and a bar fixed on the reciprocating film-carrier, as shown in my Patent No. 1,992,706, gives occasion for a friction between said parts and causes a secondary reciprocating movement of the film carrier on account of the inevitable small play of it in its guides of movement. Said secondary reciprocating movement affects the uniform tension of the film and, consequently, the good running of the mechanism.

The object of the device herein described is to prevent said difficulty.

Reference is made to Figures 1, 2 and 3.

$i$ is a pushing rod interposed between the oscillating frame $g$ and the rocker-arm $h_1$. Pushing rod $i$ is designed with a semi-cylindrical shape at both ends; and the same shape, in hollow, is provided on its supports; whereby pushing rod $i$, which is always under compression, works as a connecting rod between rocker-arm $h_1$ and oscillating frame $g$.

Pushing rod $i$ is connected to the rocker-arm $h_1$ by means of the intermediary supporting part 1, fastened to the rocker-arm $h_1$ by means of a screw 2.

An elongated boring 3 in part 1 allows to slide it along the rocker-arm $h_1$ when screw 2 is loosened.

By means of this device the amplitude of the reciprocating movement can be increased or decreased simply by setting part 1 more or less apart of the rocker-shaft $h$.

When the proper setting of part 1 in order to equalize the velocity of the reciprocating film-carrier upwards stroke with the uniform downwards velocity of the film is obtained, and therefore absolute stops and runs of the film are secured, screw 2 is fastened and part 1 is kept in the right position.

The intercalation of pushing rod $i$ between the rocker-arm $h_1$ and the oscillating frame $g$ prevents the troublesome friction above referred.

*Compressed air pistons.*—In my Patents No. 1,992,706, and No. 2,021,560, springs are used to force a continuous contact between the oscillator and the rocker-arm. Experience has shown that such springs, when moving at high speed and acceleration, lose a considerable portion of their strength and, moreover, they set into vibrations which are troublesome.

The object of the device herein described is to avoid said difficulty.

Reference is made to Figures 1 and 4.

Cylinders $k$ are mounted (or bored) on part 4 fixed to the projector frame part 5.

6 is a pipe connecting the inside chamber of cylinders $k$ to a compressed air tank.

$j$ are light hollow pistons free to slide into cylinders $k$; said pistons are connected to the oscillating frame $g_1$ by means of pushing rods 7.

The action of compressed air on pistons $j$ produces a continuous pressing of them, through rods 7, on the oscillating frame $g_1$ and, on account of connecting rods $g_2$, forces a continuous contact between the upper oscillating frame $g$ and the rocker-arm $h_1$.

Vibrations are completely prevented. The force exerted by pistons $j$ on frame $g_1$ is the same at any speed or acceleration and can be adjusted to the right amount by means of the pressure on the compressed air tank.

Consumption of compressed air is small and due only to leakage between the pistons and cylinders, or through the connections of piping.

*Counterbalance of the reciprocating film-carrier movement.*—In my Patent No. 2,021,560 a device is shown for preventing strong reactions on the bearings of the rocker shaft and the camshaft produced by the oscillator reciprocating movement on account of inertia.

Said device consists substantially in the provision of reciprocating counterweights arranged at both sides of the reciprocating film-carrier, and of a cam and a rocker-shaft for reciprocating said counterweights. The reciprocating movement and the mass of the counterweights is so settled that the inertial reactions produced by them are always equal in value but opposite in direction to the inertial reactions produced by the reciprocating film-carrier.

The whole device, as shown in detail in my Patent No. 2,021,560, includes springs to force a continuous contact of the reciprocating counterweights against their respective rocker-arms, giving occasion for similar troubles as those above stated when referring to the springs acting on the reciprocating film-carrier.

The object of the device herein described is to avoid said troubles.

Figure 6:
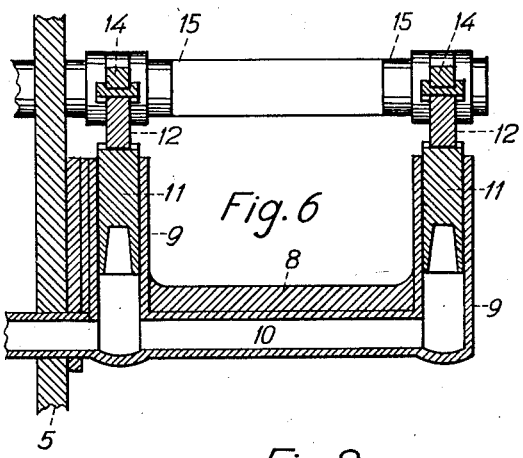

Reference is made to Figures 5 and 6.

Cylinders 9 are mounted (or bored) on part 8 fixed to the projector frame part 5.

10 is a pipe connecting the inside chamber of cylinders 9 to a compressed air tank.

11 are pistons free to slide into cylinders 9; said pistons are connected to rocker-arms 14 by means of pushing rods 12 and intermediary parts 13 which are similar to parts $i$ and 1 above described when referring to the connection between the reciprocating film-carrier and its rocker-arm.

Rocker-arms 14 are mounted on a hollow rocker-shaft 15 actioned by a cam (not shown in the drawings).

Cylinders 9 are arranged at both sides of the oscillator, although not shown in Figure 1 for the sake of clearness; and the rocker shaft $h$ which imparts the reciprocating movement to the film-carrier, passes through the hollow of rocker-shaft 15.

The whole assembly of the rocker-shafts, cams and cam-shaft is the same as described in my Patent No. 2,021,560.

When the mechanism is set at work, pistons 11 reciprocate into cylinders 9 under the action of rocker-arms 14 and the pressure of compressed air.

The cams are so designed and arranged on the cam-shaft that the velocities of the oscillator and the reciprocating pistons are always equal in value but opposite in direction.

The mass of the reciprocating pistons 11 is settled in order to produce the same inertial reactions as the oscillator at the same velocities.

Owing to the former dispositions, the inertial reactions of the oscillator and of the reciprocating pistons are always counter-balanced.

Summing up the above, it may be seen that the device herein described differs from the one described in my Patent No. 2,021,560 only in two points, namely:

(a) The use of compressed air actioned pistons instead of springs, (b) The use of the weight of the same pistons in substitution of the reciprocating counterweights.

This new device is more simple and completely vibrationless.

*Device for increasing the adherence between the driving pulley and the film.*—Experience has shown that owing to vibrations the adherence between the film and the driving pulley may be momentarily weakened; the object of the device herein described is to prevent said difficulty without damaging the film.

Figure 7:
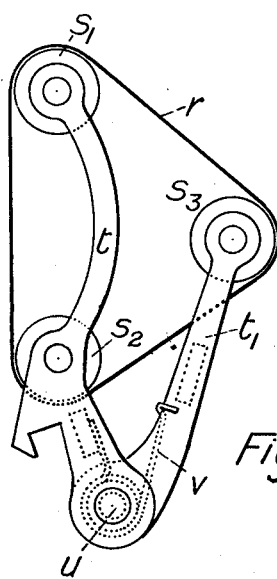
Figures 7 and 8 show a device for increasing the adherence between the driving pulley and the film, as follows.
Figure 8:
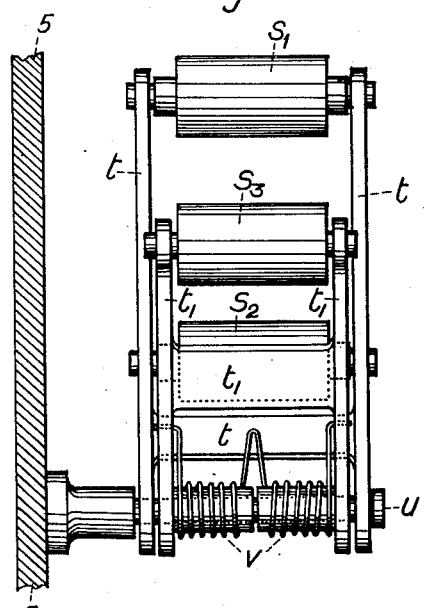

Reference is made to Figures 1, 7 and 8.

$s_1$, $s_2$ are free rollers supported by a mounting $t$ which can pivot on a shaft $u$ fixed to the projector frame part 5.

$s_3$ is a free roller supported by a mounting $t_1$ which can pivot on the same shaft $u$ as mounting $t$.

$r$ is an endless strip passing over rollers $s_1$, $s_2$ and $s_3$.

$v$ is a spring continuously tending to separate mountings $t$ and $t_1$, whereby the endless strip $r$ is kept in tension.

$w$ is a catch free to pivot on shaft 16 fixed to the projector frame part 5; said catch serves for keeping mounting $t$ in position when the device is at work.

Catch $w$ is actioned by a spring 17 and is provided with a handle 18.

The working of the device is as follows:

When the cine-projector is at rest, catch $w$ must be disengaged and the assembly of mountings $t$, $t_1$ kept apart of the driving pulley $p$ (as shown in Figure 7).

For starting a projection a film must be previously arranged through the whole mechanism as shown in Figure 1, and after this has been done, mounting $t$ is engaged on catch $w$.

When so, the endless strip $r$ is pressed against the film, and consequently increases the pressure of said film against the driving pulley $p$, whereby the force of adherence between the film and the driving pulley is increased.

A substantial feature of the device is that catch $w$ is so settled that only the strip $r$ is in contact with the film, whilst rollers $s_1$, and $s_2$ are kept apart of the driving pulley $p$, whereby only a uniform distributed pressure is exerted on the film through the strip $r$, and the damage of the film due to strong concentrated pressures, as those exerted by the direct action of pressing rollers, is avoided.

*Device to keep the film flat when passing through the field of the lens.*—The object of this device is to keep the frames of the film perfectly flat when passing through the field of the lens in order to secure a neat projected picture.

A substantial feature of the device is to allow any transversal displacement of the film.

Figure 9:
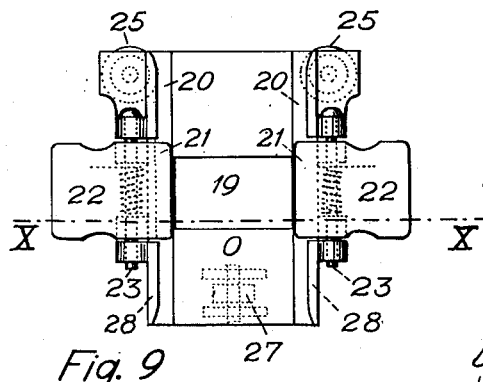
Figures 9 and 10 show a device for keeping the film flat when passing through the field of the lens, as follows.
Figure 10:
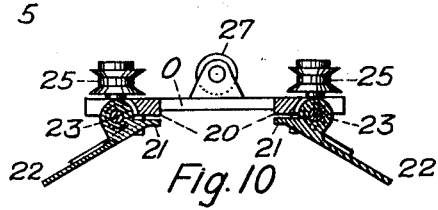

Reference is made to Figures 1, 9 and 10.

Part $o$ has an opening 19 of the same size as the frames of the film. Protruding bands 20 are provided on part $o$ at both sides of opening 19 in order to prevent any injury to the central printed part of the film.

Blades 21 provided with handles 22 are mounted on shafts 23 at each side of part o. Springs 24 press slightly blades 21 against protruding bands 20.

The film passes between bands 20 and blades 21 when passing in front of opening 19 through the field of the lens, whereby the projected frame of the film is kept flat owing to the pressure exerted by blades 21.

Part o is hung by means of wheels 25 to rail 26 fixed on the extension $l_1$ of the lens mounting $l$; therefore part o is free to move laterally.

A wheel 27 arranged on the lower part of part o serves to keep said part parallel to the field of the lens.

Lateral flanges 28 on part o serve to keep the film centered with said part; but it must be remarked that said flanges 28 are not intended to guide the film, but, contrarily, they are provided in order to allow the film to move laterally the part o if its free running so requires.

*Elimination of the play in the spur gears connecting the cam-shaft to the driving pulley shaft.*—As it has been explained in my Patent No. 1,992,706, if the constant tension devices acting over the unwinding and the rewinding reels are properly set, the tension of the film before and after passing over the driving pulley is nearly the same.

In practice not only noticeable differences continuously occur, but sometimes the tension of the film is greater before passing over the driving pulley, and sometimes it is greater after passing over said pulley.

When the first case occurs, the gearing connecting the camshaft to the driving pulley shaft forces the latter to revolve, overcoming the resistance opposed by the film.

When the second case occurs, the gearing connecting the camshaft with the driving pulley shaft exerts a braking action on the latter of them.

When a change from one to the other of the above explained cases occurs, the driving pulley shaft revolves freely during a short instant on account of the play between the teeth of the spur gears; and as a consequence the velocity of the film suffers a momentary alteration, and a small displacement of the projected picture follows.

The object of the device herein described is to prevent said fault.

Reference is made to Figures 12 and 13.

$p_1$ is the driving pulley shaft.

38 is a spur wheel fixed on shaft $p_1$.

39 is a spur wheel identical to spur wheel 38 but free to revolve around shaft $p_1$.

40 is a spring having one end fixed on shaft $p_1$ and its other end applied over crank 41 fixed on spur wheel 39.

43 is a screw fixed on gear 38 and passing through an elongated opening 44 on wheel 39.

45 is a nut and lock-nut on screw 43.

42 is the spur wheel geared to spur wheels 38 and 39.

The mounting and working of the device is as follows:

Before mounting the gearing, the teeth of gears 38 and 39 are set coincident and nut 45 is screwed, thus fastening the wheel 39 against wheel 38 and preventing the rotation of wheel 39 under the action of spring 40; after which the mounting is done in the same way as with any spur gearing.

After mounting is done, nut 45 is loosened and locked on screw 43 as shown in Figure 13, whereby spur wheel 39 is free to revolve on shaft $p_1$; and, under the action of spring 40, the teeth of spur wheel 42 are imprisoned between the teeth of spur wheels 38 and 39 whereby all play of the gearing is suppressed.

It may be criticized that the pressure between the teeth of the gears is increased and that a complementary passive resistance is introduced in the mechanism; but if an adequate lubrication is used, this fault is of no account owing to the small amount of the power to be transmitted.

Furthermore, there is an alternative use of the device which permits to reduce the play of the gears to a minimum nevertheless avoiding the above stated fault. In order to do this, nut 43 must be screwed fastening wheel 39 to wheel 38 after the play of the gearing has been reduced to the wanted amount.

Although Figures 12 and 13 refer to the driving pulley shaft, it must be understood that the same device is used in all the spur gearing between the cam-shaft and the driving pulley shaft.

*Differential corrector.*—The object of this mechanism is to allow small and exact changes of the gear ratio between the cam-shaft 29 and the driving pulley shaft $p_1$.

Figure 14:
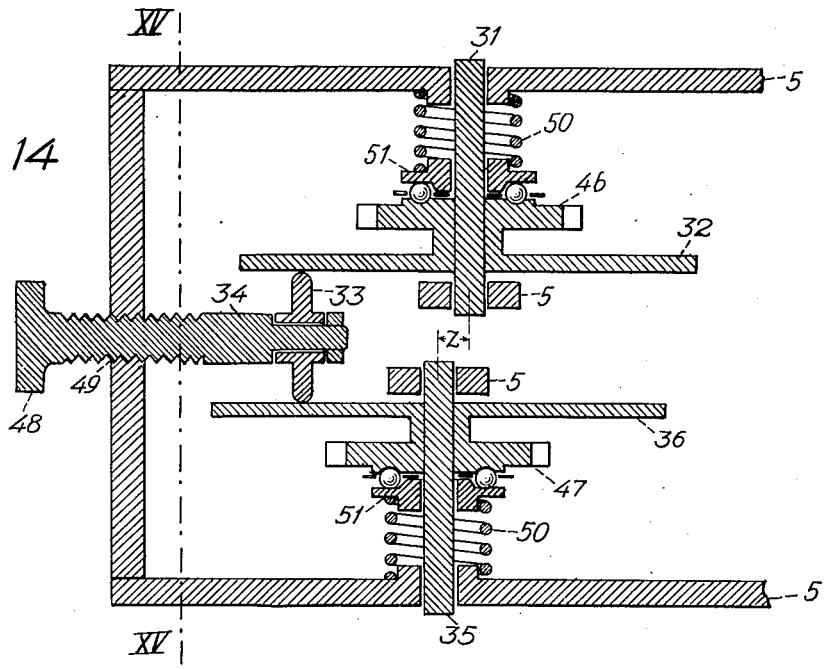
Figures 14 and 15 show a new device for the differential friction gearing between the cam-shaft and the driving pulley shaft, which I name "differential corrector", as follows.
Figure 15:
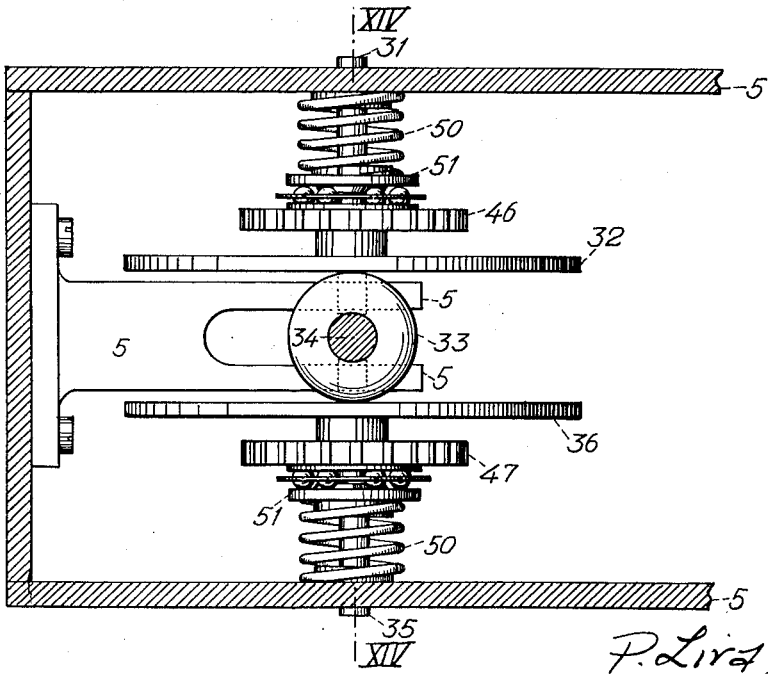

Reference is made to Figures 14 and 15.

Shaft 31, supported by the projector frame part 5, has a flat friction disc thereon, and is supposed to be geared by means of spur wheel 46 to the camshaft 29.

Shaft 35, supported by the projector frame part 5, has a flat friction disc 36 thereon, and is supposed to be geared by means of spur wheel 47 to the driving pulley shaft $p_1$.

The axes of shafts 31 and 35 are parallel but not coincident, on the contrary it is substantial for the working of the mechanism that they are set apart some distance $z$.

An intermediary shaft 34 is screwed on the projector frame part 5 at 49, so that it can be shifted along its axis by means of handle 48. Mounted on shaft 34 but free to revolve around it is a friction wheel 33.

Springs 50 acting over thrust collars 51 press flat discs 32 and 36 against friction wheel 33, whereby friction gearing is secured from shaft 31 to shaft 35 through the intermediary wheel 33.

The working of the differential device is as follows:

When the mechanism is running and handle 48 is turned, the radius of the circles in discs 32 and 36 which come in contact with the intermediary friction wheel 33 are both simultaneously increased or decreased; so, the gear ratio in transmission of movement from shaft 31 to shaft 35 suffers simultaneously an increment and a diminution, but as these variations are not equal owing to the excentricity $z$ between shafts 31 and 35, a differential change in the transmission gear ratio follows.

The principle upon which the device described works is the same as in the differential corrector shown in my Patent No. 2,021,560. The substantial difference between this latter and the device herein described consists in the use of two flat friction discs instead of two conic friction pulleys.

Having thus described my invention, what I claim as new and desire to secure by Letters Patent, is:

1. In a device of the class described, the combination of a reciprocating film-carrier for effecting the intermittent movement of a film across the field of a lens, means comprising a rocker for producing and transmitting a reciprocating movement to said film-carrier, means for continuously forcing a contact between the reciprocating film-carrier and the aforesaid rocker, said means comprising fixed hollow cylinders provided with pistons slidable therein, said pistons being connected to said reciprocating film carrier and means for continuously feeding with compressed air the inner chamber of said cylinders; the aforesaid pistons being arranged in order to force a contact between the reciprocating film-carrier and the rocker under the pressure of compressed air.

2. In a device of the class described, the combination of a reciprocating film-carrier for effecting the intermittent movement of a film across the field of a lens, means comprising a rocker for producing and transmitting a reciprocating movement to said film-carrier, means for continuously forcing a contact between the reciprocating film-carrier and the aforesaid rocker, said means comprising fixed hollow cylinders provided with pistons slidable therein, pushing rods for connecting said pistons to the reciprocating film-carrier, and means for continuously feeding with compressed air the inner chamber of the cylinders.

3. In a device of the class described the combination of a reciprocating film-carrier for effecting the intermittent movement of a film across the field of a lens, fixed hollow cylinders, reciprocating pistons slidable in said cylinders, said pistons being connected to said reciprocating film carrier and means for reciprocating said pistons, said means comprising a device for continuously feeding with compressed air the inner chamber of the aforesaid cylinders; the velocities of the reciprocating pistons and their mass being so determined that the inertia reactions produced by them are always equal in value but opposite in direction to the inertia reactions produced by the reciprocating film-carrier.

4. In a device of the class described, the combination of means comprising a reciprocating film-carrier for effecting the intermittent movement of a film across the field of a lens, a rocker for reciprocating said film-carrier, fixed hollow cylinders, reciprocating pistons slidable in said cylinders and arranged at both sides of the reciprocating film-carrier, means for continuously feeding with compressed air the inner chamber of said cylinders, other rockers for reciprocating said pistons, pushing rods for connecting said pistons to their respective rockers; and gearing for correlating the movement of the rocker which reciprocates the film-carrier and the movement of the rocker which reciprocates the pistons in such a manner that the inverted reactions produced by the reciprocating film-carrier on its rocker and the inverted reactions produced by the reciprocating pistons on their rockers are equal in value but opposite in direction and consequently balanced.

PEDRO LIRA.